United States Patent
Eckenberg

[11] Patent Number: 6,050,801
[45] Date of Patent: Apr. 18, 2000

[54] CROSS DISCHARGE HEAD FOR EXTRUSION EQUIPMENT

[75] Inventor: Dietrich Eckenberg, Hannover, Germany

[73] Assignee: Paul Troester Maschinenfabrik, Hanover, Germany

[21] Appl. No.: 09/072,714

[22] Filed: May 5, 1998

[30] Foreign Application Priority Data

May 7, 1997 [DE] Germany .................. 197 19 220

[51] Int. Cl.[7] .................................................. B29C 47/22
[52] U.S. Cl. ................ 425/113; 425/190; 425/192 R; 425/381; 425/466; 425/467
[58] Field of Search .................. 425/113, 190, 425/192 R, 380, 381, 466, 467

[56] References Cited

U.S. PATENT DOCUMENTS

| 3,304,579 | 2/1967 | Ashworth, Jr. ................. | 425/192 R |
| 4,111,630 | 9/1978 | Shiomi et al. ................... | 425/381 |
| 4,124,346 | 11/1978 | Greenwood et al. ............ | 425/192 R |
| 4,280,801 | 7/1981 | Wheeler, Jr. et al. ........... | 425/192 R |
| 4,619,599 | 10/1986 | Herbert et al. .................. | 425/192 R |

*Primary Examiner*—Harold Pyon
*Assistant Examiner*—Joseph Leyson
*Attorney, Agent, or Firm*—Lackenbach Siegel Marzullo Aronson & Greenspan

[57] ABSTRACT

The invention relates to a cross discharge head for extrusion equipment comprising a housing to be mounted on an extruder, which in its interior receives an annular feeding channel encompassing a passage, disposed in the housing and disposed at an angle to the direction of extrusion of the extruder, for the supply of a product to be ensheathed with the extrudate, which receives in its interior a distributor piece, and which at the exit is provided with annular outer shaping tools tapering the stream of extrudate, which are secured on the front face of the housing so as to be exchangeable, wherein the passage at the end side is encompassed by a conical guidance nipple whose outside is simultaneously also the inner shaping tool. The invention creates with simple means a short, stout and compact cross discharge head which can be cleaned readily and rapidly without disassembling its individual structural parts, can be adjusted rapidly and without problems and whose faces bringing about the distribution and shaping of the stream of extrudate can be reworked without any problem and entail the capability of being readily replaceable. The invention comprises that the outer shaping tools form a fixedly contiguous assembly unit which is secured on the housing and which can be dismounted as such from the housing, that the annular feeding channel disposed in the housing is disposed directly in the parting plane of the housing and the assembly unit comprising the shaping tools.

16 Claims, 1 Drawing Sheet

CROSS DISCHARGE HEAD FOR EXTRUSION EQUIPMENT

BACKGROUND OF THE INVENTION

The invention relates to a cross discharge head for extrusion equipment comprising a housing to be mounted on an extruder, which, in its interior, receives an annular feeding channel which encompasses a passage disposed in the housing and at an angle to the direction of extrusion of the extruder, for the supply of a product to be ensheathed with the extrudate, which in its interior receives a distributor piece, and which at the exit is provided with annular outer shaping tools tapering the stream of extrudate, which tools are detachably attached on the front face of the housing, wherein the passage is encompassed at the end by a conical guidance nipple whose outside is simultaneously also the inner shaping tool.

By cross discharge head is understood such discharge head whose direction of extrusion extends transversely or at an angle obliquely to the direction of extrusion of the preceding extruder. The passage for the supply of a product to be ensheathed with the extrudate can be disposed centrally or eccentrically in the discharge head housing.

DESCRIPTION OF THE RELATED ART

Such cross discharge heads are available in various type models. They have in common that their housing comprises two relatively long structural parts one placed into the other, of which the inner one encompasses the passage for the supply of the product to be ensheathed and most often has a conical outer surface, while the inside of the outer structural part is most often also conical and both conical surfaces must be completely identical in terms of form in order to serve in the assembled state of the cross discharge head as a sealing when they are in contact with one another. Into at least one of these two conical surfaces flow paths for the extrudate are milled in order to distribute the extrudate uniformly and annularly about the central passage, which extrudate enters through an aperture of the wall of the outer housing part disposed approximately centrally in the cross discharge head, into the cited flow paths of the cross discharge head in order to form in this way a (sheathing) tube. This is achieved successfully without any problems with sufficient structural length and the use of complicated distributor contours and adjustment means so that such cross discharge heads can be used virtually anywhere in the relevant industry.

At the exit side front face of the housing are disposed operating means which bring about the final portion of the shaping of the extrudate stream which is here already predistributed in the form of tubing. This operating means is preferably attached with screw threads. This operating means tapers the tube-form extrudate stream in terms of its cross-sectional dimensions and conducts it into the mouthpiece which is also annular.

These cross discharge heads are not inexpensive to produce. The production of the two, most often, conical or also cylindrical sealing faces requires in particular high precision. Complicated is also the shaping of the flow paths worked into at least the one inner surface because in these, in addition to the distribution of the extrudate into the form of a tube, simultaneously takes place the essential portion of the shaping work.

Cleaning these cross discharge heads presents further problems when the processed rubber mixtures are changed for which purpose the parts of the cross discharge head must be dissembled, cleaned individually and subsequently must be assembled again. The work of disassembly, cleaning and the subsequent assembly requires considerable time expenditures during which the discharge head, and most often also the extrusion equipment equipped with it, are unavailable for operation.

SUMMARY OF THE INVENTION

The invention avoids the disadvantages of prior art. It is the task of the invention to create with simple means a short, stout and compact cross discharge head which, without disassembly of its individual structural parts, can readily and quickly be cleaned, can be adjusted rapidly and without problems and whose faces bringing about the distribution and shaping of the extrudate flow can be reworked without problems and entail the capability of a ready exchange when changing the extrudate or in the event abrasions occur.

The invention comprises that the outer shaping tools form a fixedly connected assembly unit which is disposed on the housing and can be dismounted as such from the housing, that the annular feed channel disposed in the housing is disposed in the parting plane of housing and assembly unit of the shaping tools, and that the parting plane between housing and assembly unit forms with the center axis of the passage an approximately right angle and/or represents preferably a planar plane.

With this simple construction, surprisingly, the listed disadvantages of the known cross discharge heads are avoided:

The longitudinal, most often conical, faces and the working of the flow channels into these faces can be omitted without replacement.

The work of extrudate distribution and shaping are moved to the narrow region about the parting plane between housing and the assembly unit of the shaping tools and are there performed substantially separate one from the other, the distribution at the front face of the housing and the shaping in the assembly unit of the shaping tools.

The cross discharge head is simpler and therefore more cost-effective in the production.

The flow paths can be formed more readily and can be cleaned more easily.

The cleaning work can be carried out more rapidly and more easily and thus with lesser time expenditures. The downtimes of the discharge head, and thus also of the extrusion equipment, consequently are reduced.

The cross discharge head is of lower weight and lesser overall volume.

This cross discharge head can be implemented such that the depth of the annular feed channel (viewed in the direction of extrusion of the cross discharge head) is low relative to its diameter. This leads to shorter structural form and cleaning is further made easier.

It is especially advantageous if the shaping tool directly adjoining the parting plane with the face facing the stream of material, the tangents of which face form preferably an obtuse angle, is an exchangeable ring. This ring can readily and independently of other structural parts be adjusted, it can optionally be reworked readily and in the case of an extrudate change or in the case of abrasions can optionally be readily replaced.

For this purpose it is advantageous if the exchangeable distributor ring which forms the first portion of the outer shaping tools directly adjoining the parting plane, is adjustable transversely to the material flow by means of an adjusting device.

It further shortens the machine down-times if in this cross discharge head the assembly unit of the outer shaping tools is attached on the housing with a rapid-attachment device. In this case the assembly unity of the shaping tools can be attached and/or detached readily and rapidly to/from the front face of the housing.

For this purpose it is especially advantageous if the assembly unit of the shaping tools is pivotably supported on the housing by means of a joint or slidably in guides.

The processing of abrasive extrudates entails that in and on the channels conducting the extrudate in the interior of the cross discharge head, signs of abrasion become evident which affect the production process in particular if they occur on the distribution and shaping channels. In order to be able in such cases to exchange these rapidly, it is of advantage if the distributor channel directly adjoining the parting plane and disposed in the front face of the housing is worked into a ring which is placed into a front-face recess of the housing. The exchange is also of advantage for changing, respectively exchanging, flow contours.

Since in this cross discharge head the spatial zone of extrudate distribution and shaping is most often very short and because next to the extrudate feed channel space for disposing the shaping tools is required, the extrudate feeding into the distributor channel in some cases must take place obliquely or in parallel to the direction of extrusion of the cross discharge head. It is in these cases of advantage if the feeding channel supplying the extrudate from the extruder into the annular feeding channel comprises an arc or a bend and preferably ends of which the one leading into the distributor channel extends approximately parallel to the axis of the cross discharge head, however, the other end approximately transversely to the axis of the cross discharge head.

It is furthermore of advantage for the realization of the cross discharge head that in the assembly unit of the outer shaping tools the mouthpiece encompassing the guidance nipple is a ring which is secured such that it is adjustable through displacement tools, disposed on its outer circumference, with respect to its radial position relative to the guidance and inner shaping nipple.

It has been found to be an especially useful structural shape of this cross discharge head if the assembly unit of the outer shaping tools comprises an annular basic element with an inwardly directed flange, whose side, facing the housing of the cross discharge head, is contacted by the displaceable distributor ring in contact on the front face of the housing and whose other side is contacted by the mouthpiece, if the basic element bears the tools for the radial adjustment and securement of the radially adjustable distributor ring and of the mouthpiece, and if the basic element is disposed on the housing of the cross discharge head so as to be foldable or axially displaceable. This basic element in cross section can have an outer form which is different from a rectangular or square form.

This cross discharge head can also be realized such that the passage disposed centrally or eccentrically in the housing is implemented in an additional part as a center sleeve.

It can be useful if the center sleeve with the passage disposed therein is disposed so as to be axially adjustable and optionally lockable.

The possibility also exists herein that the housing, respectively the center sleeve, is implemented for receiving exchangeable guidance elements.

This cross discharge head can also be implemented such that the housing, respectively the center sleeve, is implemented for receiving sealing connecting parts for additional agents or for a vacuum connection.

This cross discharge head can also be implemented such that the horizontal angle between extruder axis and discharge head axis departs from a right angle.

Another embodiment possibility of this cross discharge head comprises that the discharge head axis extends horizontally or at an angle up to the vertical axis.

In the following the essence of the invention will be described in further detail in conjunction with an embodiment example depicted schematically in the drawing. Therein show:

DETAILED DESCRIPTION OF THE INVENTION

Figure 1:
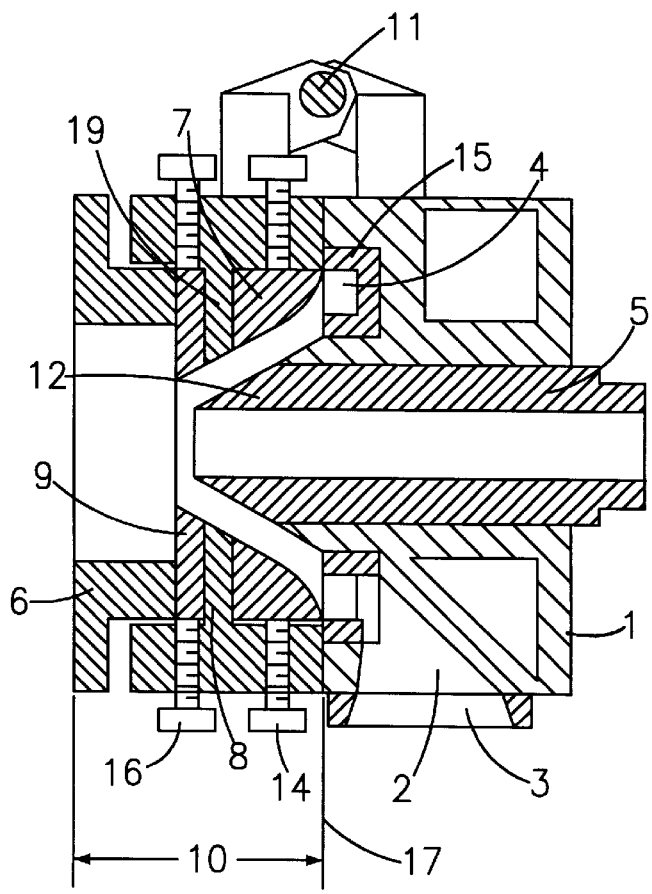
FIG. 1 a section through the cross discharge head.
Figure 2:
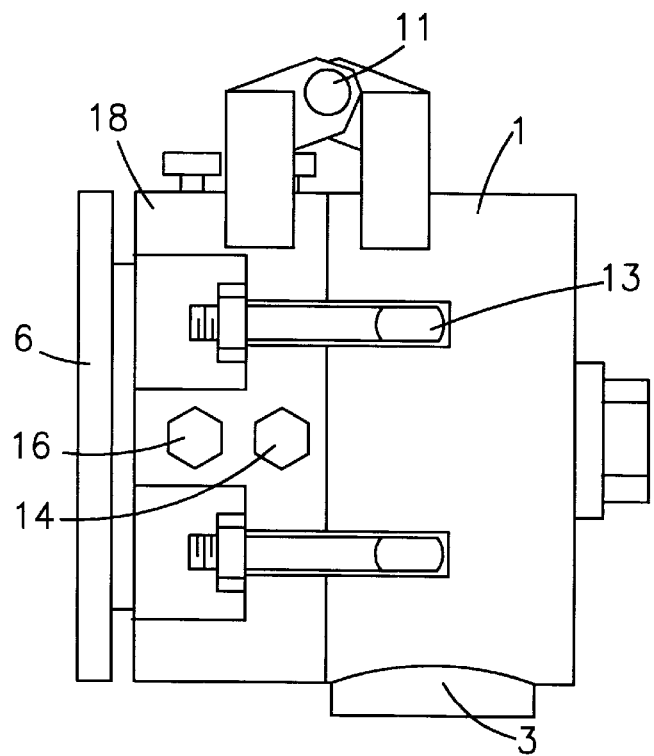
FIG. 2 a view of this cross discharge head.

The cross discharge head comprises a (not shown) extruder to be mounted on the housing 1 provided for this purpose with a flange 3 which at the entrance side serves for flange-mounting to the (not shown) extruder cylinder or an intermediate flange. The housing 1 receives in its interior on its front face an (at least approximately) annular distributor channel 4 which encompasses concentrically a passage 5 disposed centrally in the housing 1 and extending transversely to the direction of extrusion of the extruder, for supplying a (not shown) product to be ensheathed with the extrudate. In this distributor channel 4 terminates the feeding channel 2 coming from the extruder and extending through the flange 3, which channel has a bend in its course. In the adjoining distributor channel 4 the extrudate is guided such that it (initially at an interval) encompasses annularly the passage 5 and thus forms the start of an extrudate tubing. The depth of the annular distributor channel 4 (viewed in the direction of extrusion of the cross discharge head) is low relative to its diameter.

In front of the front face of housing 1 of the cross discharge head are disposed shaping tools 7, 8, and shaping mouthpiece 9 which (through retaining nuts 6) are combined to form a assembly unit. This assembly unit 10 is articulated with a joint 11 on the housing 1 and secured on housing 1 by means of connecting bolts 13. The front face is therein disposed in the parting plane 17 between housing 1 and assembly unit 10 of the shaping tools 7, 8, and mouthpiece 9.

The shaping tools 7, 8, and mouthpiece 9 form the outside of the tubular extrudate and decrease the diameter of the extrudate tube. The inside of this extrudate tube is formed by the outside of a nipple 12 which is disposed at the end of passage 5. This nipple 12 serves with its inside for centering the product introduced through passage 5 and to be ensheathed by the extrudate tube.

The assembly unit 10 of the shaping tools 7, 8, and mouthpiece 9 comprises an annular or rectangular or square basic element 18 with an inwardly directed flange 19 on whose side facing the housing 1 of the cross discharge head the distributor ring 7, adjustable transversely to the direction of flow of the extrudate and contacting the front face of housing, is in contact and on whose other side the mouthpiece 9 is in contact. This mouthpiece 9 is also adjustable transversely to the direction of flow of the extrudate and specifically through adjusting screws 16. The basic element 18 bears the elements of the adjusting device (14) for the radial adjustment of the distributor ring 7 and of the mouthpiece 9. The distributor ring 7 can comprise different inner surfaces or inner contours depending on the extrudate to be processed and is therefore readily replaceable.

Of the annular shaping tools 7, 8, and mouthpiece 9 of the assembly unit 10 the distributor ring 7 contacting the front face of housing 1 is of particular importance since this distributor ring 7 substantially forms and determines the shape of the extrudate tube. The distributor ring 7 directly adjoining the parting plane with the face facing the extrudate stream is a readily replaceable ring. With changed flow behavior of a different extrudate when changing extrudate or upon the occurrence of abrasion at its surface it can therefore be replaced readily by another, respectively new, ring. This ring is secured by means of adjusting screws 14 so as to be adjustable.

The distributor channel 4 directly adjoining the front face, forming the parting plane 17, of housing 1 and disposed in the front face of housing 1 is worked into a ring 15 which is placed into a front-face recess of housing 1. With flow behavior which is to be modified and/or upon the occurrence of signs of abrasion, this ring 15 can be exchanged against a new ring.

What is claimed is:

1. Cross discharge head for an extruding apparatus, comprising: a housing having a centrally disposed passage (5), and being mounted on an extruder, which interiorly has a feeding channel leading to an annular feeding distributor channel which encompasses said passage disposed in the housing and extends transversely to the direction of extrusion of extrudate from the extruder, for supplying a product to be ensheathed with the extrudate, said housing being provided with said distributor channel, and at its exit is located at least one annular outer shaping tool for tapering the extrudate from the distributor channel, and said at least one outer shaping tool being disposed adjacent on a front face of the housing so as to be easily exchangeable, or repairable, wherein extrudate passage from the distributor channel is encompassed by a conical guidance nipple whose outside is simultaneously also an inner shaping tool, characterized in that said at least one outer shaping tool and a mouthpiece (9) for shaping the extrudate form a contiguous assembly unit (10) mounted on the housing (1) which is readily disconnectable from the housing (1) for rapid repair and/or replacement, and that said distributor channel (4) is disposed in the housing (1) directly adjoining a parting plane (17) of the housing (1) and the assembly unit (10).

2. Cross discharge head as claimed in claim 1, characterized in that the parting plane (17) formed between the housing (1) and the assembly unit (10) forms with the center axis of the passage (5) an approximately right angle.

3. Cross discharge head as claimed in claim 1, wherein said at least one outer shaping tool includes a removable/replaceable distributor ring (7) adjacent to the parting plane (17).

4. Cross discharge head as claimed in claim 3, wherein said removable/replaceable distributor ring (7) is adjustable transversely to the stream of extrudate by means of an adjusting device.

5. Cross discharge head as claimed in claim 1, characterized, in that the assembly unit (10) and said at least one annular outer shaping tool is supported on the housing (1) so as to be pivotable or displaceable therefrom.

6. Cross discharge head as claimed in 5, characterized in that the assembly unit (10) with said at least one annular outer shaping tool is secured on the housing (1) by means of at least one rapid-securement device (13).

7. Cross discharge head as claimed in claim 1, said distributor channel (4) directly adjoining the parting plane (17) and being disposed in the front face of the housing (1) and formed as a ring (15) disposed in a recess of the housing (1) so as to be also readily disconnectable and/or exchangeable.

8. Cross discharge head as claimed in claim 1, wherein said assembly unit (10) includes an annular basic element with an inwardly directed flange whose side facing the housing is contacted by said at least one outer shaping tool and whose other side is contacted by the mouthpiece, and the annular basic element (18) includes a plurality of adjusting means for radial adjustment and mounting of the at least one outer shaping tool and the mouthpiece, and said annular basic element (18) is disposed on the housing (1) so as to be pivotable thereto or axially displaceable for facilitating replacement or repair.

9. Cross discharge head as claimed in claim 8, wherein said basic element is provided with an outer shape of rectangular or square form.

10. Cross discharge head as claimed in claim 1, further including a center sleeve in said centrally disposed passage, and said center sleeve being provided with a center passageway.

11. Cross discharge head as claimed in claim 1, further including a center sleeve in said centrally disposed passage, and said center sleeve being provided with an eccentric passageway.

12. Cross discharge head as claimed in claim 9, characterized by said passage disposed centrally in the housing having a center sleeve therein.

13. Cross discharge head as claimed in claim 10, characterized in that the center sleeve with the passageway disposed therein is axially adjustable.

14. Cross discharge head as claimed in claim 12, characterized in that the housing is adapted to receive exchangeable guidance elements.

15. Cross discharge head as claimed in claim 1, characterized in that the housing is adapted to receive sealing connection parts for a vacuum or for handling various agent streams.

16. Cross discharge head as claimed in claim 12, characterized in that the housing is adapted to receive sealing connection parts for a vacuum or for handling various agent streams.

* * * * *